US011961035B1

(12) United States Patent
Neville et al.

(10) Patent No.: US 11,961,035 B1
(45) Date of Patent: Apr. 16, 2024

(54) ENHANCED GEOGRAPHICAL CACHING

(71) Applicant: Amazon Technologies, Inc., Seattle, WA (US)

(72) Inventors: Michael John Neville, Bunya (AU); Ryan David Hapgood, Cannon Hill (AU); Jeremy S. Jonas, Cibinong (ID); Ken Peter Gilmore Wilson, Brisbane (AU); Charles Plunkett O'Farrell, Windsor (AU)

(73) Assignee: Amazon Technologies, Inc., Seattle, WA (US)

(*) Notice: Subject to any disclaimer, the term of this patent is extended or adjusted under 35 U.S.C. 154(b) by 207 days.

(21) Appl. No.: 17/707,528

(22) Filed: Mar. 29, 2022

(51) Int. Cl.
| G06Q 10/0833 | (2023.01) |
| G06Q 50/30 | (2012.01) |
| H04W 4/021 | (2018.01) |
| H04W 4/029 | (2018.01) |

(52) U.S. Cl.
CPC ......... G06Q 10/0833 (2013.01); G06Q 50/30 (2013.01); H04W 4/022 (2013.01); H04W 4/029 (2018.02)

(58) Field of Classification Search
CPC ............................ G06Q 10/0833; G06Q 50/30
USPC ......................................................... 705/333
See application file for complete search history.

(56) References Cited

U.S. PATENT DOCUMENTS

| 2018/0113880 A1* | 4/2018 | Metcalf-Putnam ......................... G06F 16/24532 |
| 2018/0322431 A1* | 11/2018 | Folck ...................... G01S 19/51 |
| 2020/0162850 A1* | 5/2020 | Pylappan ............... G08B 21/22 |

FOREIGN PATENT DOCUMENTS

| WO | WO-2019182658 A1 * | 9/2019 | ......... G01C 21/3407 |

OTHER PUBLICATIONS

Giovane C. M. Moura, et al. "Cache Me If You Can: Effects of DNS Time-to-Live." 2019. In Proceedings of the Internet Measurement Conference (IMC '19). Association for Computing Machinery, New York, NY, USA, pp. 101-115. https://doi.org/10.1145/3355369.3355568. (Year: 2019).*

* cited by examiner

Primary Examiner — Jeff Zimmerman
Assistant Examiner — Hunter A Molnar
(74) Attorney, Agent, or Firm — Eversheds Sutherland (US) LLP (57) ABSTRACT

Devices, systems, and methods are provided for enhanced geographical caching of estimated arrival times. A method may include receiving respective user inputs indicative of respective users being in transit to a destination location from within a geographic region; determining, for the first user and the second user, a first estimated time of arrival from a first geographical area to the destination location, the first geographical area including the first location and the second location; identifying a third location of the first device at a third time, wherein the third location is within the first geographical area; determining that a time-to-live (TTL) of the first estimated time of arrival has not expired at the third time; and refraining from recalculating the first estimated time of arrival.

20 Claims, 6 Drawing Sheets

ENHANCED GEOGRAPHICAL CACHING

BACKGROUND

When people are in transit to a location for delivery or pick-up of items, someone at the location may depend on the arrival time at the location. For example, a person commuting to a grocery store to pick up pre-ordered groceries may take a while to arrive at the grocery store for pick-up, or may arrive quickly after placing an order. Therefore, it is beneficial for a person at the pick-up or delivery location to be aware of when the person in transit may arrive, such as a grocery store clerk needing to know when to collect and bag groceries for pick-up. Systems for providing estimated arrival times may require too many pings and refreshes.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced geographical caching.

When a person purchases an item for pick-up, another person at the pick-up location may benefit from knowing when the person will arrive to pick-up the items. For example, a person in transit to a store to pick-up groceries may arrive within five minutes or within thirty minutes, and the time of arrival matters to allow someone to prepare the purchased items for pick-up (e.g., bagging groceries or other purchased items). Similarly, a person at a delivery or another destination location may benefit from knowing the estimated arrival time of a person or vehicle in transit to the destination location.

Some existing systems for tracking estimated arrival times and notifying people and devices of the estimated arrival times may rely on geo-fencing. For example, when a person or vehicle is within a particular geo-fenced area, that area may be indicative of the estimated travel time to the destination location for pick-up or delivery.

Some existing systems may rely on a cached value representative of the estimated arrival time for a particular location (e.g., a geo-fenced area). For example, when a device determines an estimated travel time or arrival time from one location to another location, the device may rely on the cached value indicating the travel time from a particular area.

Because some existing systems rely on calls to a service that provides the estimated arrival value, as a person or vehicle is in transit to a destination, multiple calls may be made to the service that may require multiple refreshes (e.g., updates/recalculations) of the estimated arrival value. When multiple devices for multiple people and/or vehicles are calling the service for the estimated arrival value, the result may be that many refreshes are required to be applied to the estimated arrival value (e.g., refreshes to a cache that stores the estimated arrival time).

There is therefore a need for enhanced dynamic geographical caching of estimated arrival times.

In one or more embodiments, enhanced dynamic geographical caching of estimated arrival times may rely on a time-to-live (TTL) applied to the estimated arrival time for any geo-fenced or chrono-fenced area. In particular, as long as the TTL for any estimated arrival time has not yet expired (e.g., while a person or vehicle is in transit to a location), any calls for a estimated arrival time may return the same value when the calls are made from within a same geo-fenced or chrono-fenced area. In this manner, calls made for the estimated arrival time of a same or multiple parties in transit in a same geo-fenced or chrono-fenced area may return the same estimated arrival time, whether the party in transit is at a location within the geo-fenced or chrono-fenced area that is further away from the destination location or is at a location within the geo-fenced or chrono-fenced area that is closer to the destination location. As a result, recalculations of the estimated arrival time may be reduced, and a system that uses geo-coordinates of a device (e.g., with user consent and in accordance with relevant laws) to predict the estimated arrival time to be cached may benefit technically from having to refresh the cache fewer times.

In one or more embodiments, because calls made for the estimated arrival time of a same or multiple parties in transit in a same geo-fenced or chrono-fenced area may return the same estimated arrival time, the estimated arrival time for different locations within the same geo-fenced or chrono-fenced area may be slightly inaccurate, an enhanced system may vary the size of a geo-fenced or chrono-fenced region and/or TTL for a geo-fenced or chrono-fenced region. For example, geo-fenced or chrono-fenced regions closer to a destination location may be smaller than geo-fenced or chrono-fenced regions further away from the destination location. Similarly, TTLs for geo-fenced or chrono-fenced regions closer to a destination location may be smaller than TTLs for geo-fenced or chrono-fenced regions further away from the destination location. In particular, accurate estimated arrival times may be more critical when the party in transit is closest to the destination location because someone at the destination location may need to take actions (e.g., gather purchased items, be at the destination location, etc.) as the estimated arrival time approaches, whereas the person at the destination location has more time when the party in transit is further away (e.g., knowing when the arrival is within five minutes is more important than knowing that the arrival is thirty minutes away). By varying geo-fence or chrono-fenced sizes and TTLs based on accuracy requirements, some inaccuracies may be tolerated (e.g., for regions further away from the destination location), allowing for fewer required cache refreshes, and triggering fewer actions (e.g., notifications to bag groceries) than are needed given the estimated arrival time.

In one or more embodiments, TTLs may correspond to respective geo-fenced or chrono-fenced regions. As a party begins transit to a destination location, the party may indicate (e.g., via a device input) that they are in transit to the destination location, triggering (and consenting to) the tracking of the party's location (e.g., using global navigation satellite system data of a device) while the party is in transit to the destination location. As the party's location is identified as within a geo-fenced or chrono-fenced area, when a device calls for the estimated arrival time value for a party, a device may refrain from recalculating the estimated arrival time for the geo-fenced or chrono-fenced area when the TTL has not yet expired. In this manner, prior to TTL expiration for an estimated time of arrival from a geo-fenced or chrono-fenced area, and request for an estimated time of arrival from the geo-fenced or chrono-fenced area may return the same estimated time of arrival without recalculating the estimated time of arrival. When the TTL expires for an estimated time of arrival, a device may recalculate the estimated time of arrival for the geo-fenced or chrono-fenced area, which may result in the same estimated arrival time or a different one.

In one or more embodiments, a location determination system may use the global navigation satellite system data to determine an updated location of the party's device, in which geo-fenced or chrono-fenced area the party's device is (e.g., the party's location), and the corresponding TTL for the geo-fenced area. In this manner, the active TTL for the geo-fenced or chrono-fenced area (e.g., before TTL expiration) may prevent refreshes to an estimated arrival time for a geo-fenced or chrono-fenced area until the TTL expires for the geo-fenced or chrono-fenced area, reducing the need to update the estimated arrival time value for any geo-fenced or chrono-fenced area. When the party's device is detected in a different geo-fenced or chrono-fenced area, a device may request the estimated time of arrival from that geo-fenced or chrono-fenced area, and when the TTL for that estimated time of arrival has not expired, that estimated time of arrival may not be refreshed. The size of the region/geo-hash and/or TTL may vary based on desired accuracy (e.g., distance from a destination location/point of interest). A geo-hash is one way to segment a physical space (e.g., region), but the disclosure herein is not limited to geo-hashing as the segmentation method.

In one or more embodiments, a system may force a refresh of the estimated arrival time value if an adjacent value varies beyond a threshold amount. For example, when a party in transit to a destination location moves from one geo-fenced or chrono-fenced area to another geo-fenced or chrono-fenced area, and the transition time from the first geo-fenced or chrono-fenced area to the second geo-fenced or chrono-fenced area is larger than the difference between the respective estimated times of arrival from the two geo-fenced or chrono-fenced areas, then a device may recalculate the estimated time of arrival for the first geo-fenced or chrono-fenced area.

In one or more embodiments, estimated arrival times may be updated based on contextual data, such as when a change in traffic may impact the estimated arrival time. When a person is within a region with a TTL (e.g., corresponding to an expected time needed to travel to an adjacent region with another TTL), the TTL expires, and the updated location determination by the location service indicates that the person is still in the same region (e.g., due to traffic), the estimated arrival time for the person may be the same as it was prior to the TTL expiration (e.g., the person's estimated arrival time may be thirty minutes, and after TTL expiration ten minutes later, the person may be in the same region with the same estimated thirty minute arrival time despite being ten minutes later). When traffic or inclement weather, for example, are detected, the cached value may be refreshed even prior to TTL expiration. Alternatively or in addition, the TTL for a region, or the region itself, may be adjusted (e.g., increased when traffic or inclement weather are detected in the region).

In one or more embodiments, when a party in transit to a destination location/location of interest is within a threshold amount of time from the destination location/location of interest, a system may generate and present notifications. For example, the notifications may indicate the estimated arrival time from the cache. When the destination location/location of interest is a pick-up location, the notifications may indicate that pre-purchased items of the party in transit need to be gathered and/or otherwise prepared for pick-up. When an order has a threshold number of items, the threshold amount of time may be longer (e.g., to allow for more time to prepare the larger number of items for pick-up).

In one or more embodiments, when a TTL for an estimated time of arrival of a geographic area expires, the estimated time of arrival for the geographic area may be refreshed to reflect updated conditions. For example, traffic, weather, and other conditions may change over time, so the estimated times of arrival of multiple geographic areas may be updated to reflect the changing conditions, allowing for an accurate estimated time of arrival for any person in transit. The TTLs and/or geographic areas also may be updated. For example, smaller geographic areas and TTLs may be implemented to provide additional accuracy.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
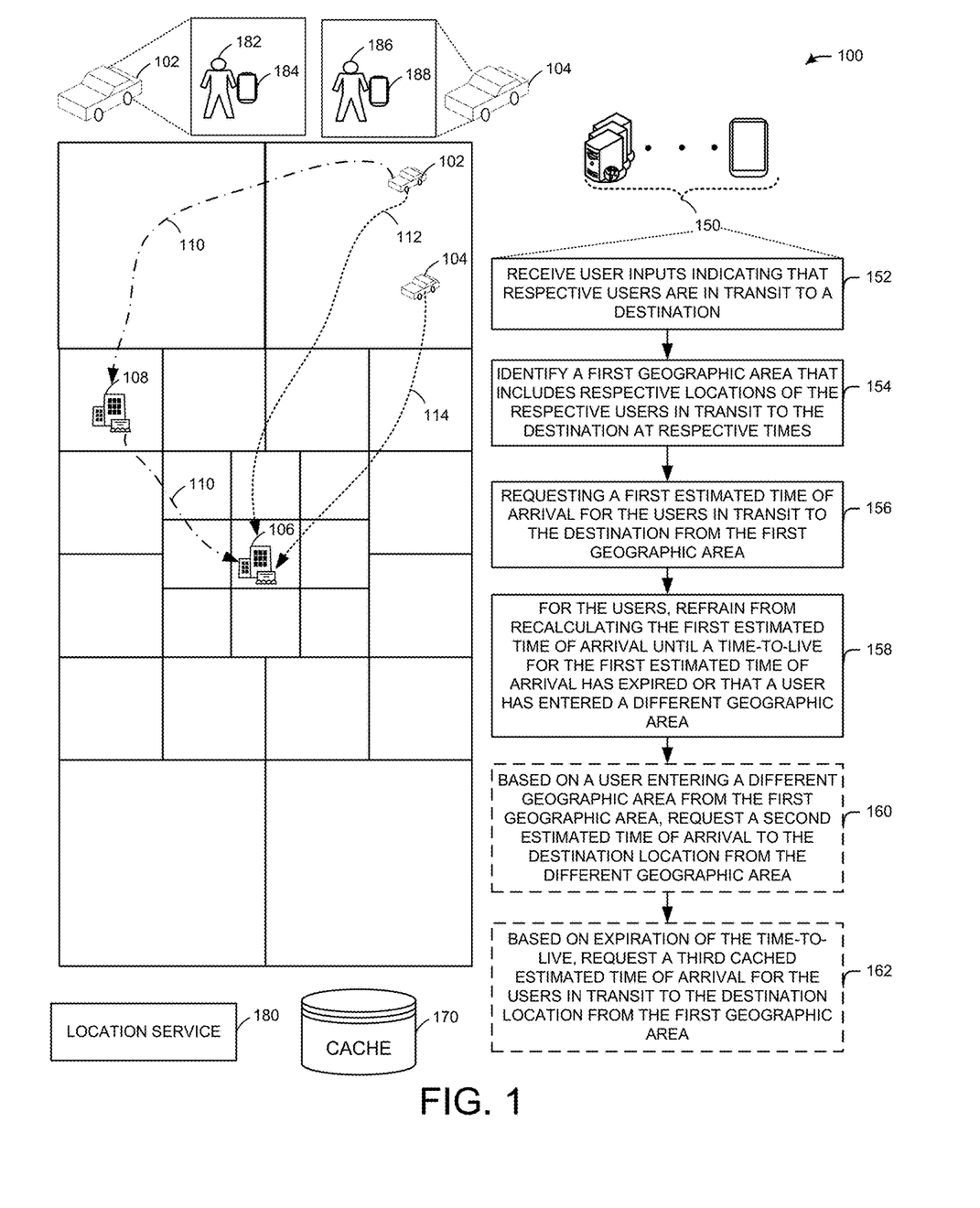
FIG. 1 illustrates an example system for enhanced geographical caching, in accordance with one or more example embodiments of the present disclosure.

FIG. 1 illustrates an example system 100 for enhanced geographical caching, in accordance with one or more example embodiments of the present disclosure.

Referring to FIG. 1, the system 100 may include vehicles (e.g., vehicle 102, vehicle 104) in transit to one or more destination locations (e.g., destination location 106, destination location 108). For example, the vehicle 102 may use a route 110 to the destination location 108 and then to the destination location 106 (e.g., estimated times of arrival may be based on multiple destination locations for a single vehicle), or may use a route 112 to the destination location 106. The vehicle 104 may use the same or a different route 114 to the destination location 106 (e.g., depending on where the respective vehicles are coming from). The geographic area around the destination locations may be divided into geo-fenced (or chrono-fenced) areas (e.g., the rectangles of various sizes shown in FIG. 1 may represent respective geographic areas). The geographic areas may be of any shape or size, and the size may vary based on a desired accuracy of an estimated time of arrival for any vehicle in transit from a respective geographic area to a respective destination location. For example, geographic areas more proximate to a destination location may be smaller than geographic areas further away from a destination location. Such a size variance may be implemented because it may be more beneficial to identify when a vehicle in transit is close to arriving at a destination location, whereas a later estimated time of arrival for a vehicle in a geographic area further away from a destination location may not require as much timing accuracy.

Still referring to FIG. 1, one or more devices 150 may implement a process, including step 152, in which the one or more devices 150 may receive respective user inputs indicating that respective users (e.g., passengers of the vehicles) are in transit to a destination location. For example, as a person is leaving to travel to the destination location, the person may provide an input (e.g., via a device) indicating that the person is on the way. The user inputs may allow for tracking the person's location while in transit (e.g., with user consent and in accordance with relevant laws). At step 154, the one or more devices 150 may identify a first geographic area that may include respective locations of multiple users who have provided the user inputs at step 152. As explained further herein, the location of a user's device may be determined and provided to the one or more devices 150, along with a corresponding geographic area that includes the location. Multiple users may be within a same geographic area. For users in a same area, at step 156, the one or more devices 150 may request a first estimated time of arrival for the identified geographic area in which the users are located at step 154. The requested estimate may be provided to the one or more devices 150 as the estimated time of arrival for the geographic area identified in the request at step 156. In this manner, requests for any user at any location within the same geographic area may return the same estimated time of arrival for the geographic area. Because the estimated time of arrival may be cached with a TTL, once an estimated time of arrival for any user whose is within the geographic area has been requested, at step 158, the one or more devices 150 may refrain from recalculating the estimated time of arrival for that geographic area (e.g., until the TTL for that geographic area has expired). The one or more devices 150 may have access to the TTLs for any geographic area.

Still referring to FIG. 1, optionally, at step 160, when a user's location indicates that they have entered a different geographic location, the one or more devices 150 may request an estimated time of arrival for the different geographic area. When the TTL for the estimated time of arrival for the different geographic area has not yet expired, the one or more devices 150 may refrain from recalculating the estimated time of arrival for the different geographic area. Optionally at step 162, when the TTL for a geographic area has expired, the one or more devices 150 may request an updated estimated time of arrival for the geographic area for any user in the geographic area upon TTL expiration. A new TTL for any estimated arrival time may be used, which may be the same or different than a previous TTL.

Still referring to FIG. 1, the estimated times of arrival for respective geographic areas may be stored in a cache 170. In this manner, the requests at step 156, step 160, and step 162 may be made to the cache. By using the TTL to cause the one or more devices 150 to refrain from refreshing an estimated time of arrival in response to requests for the estimated time of arrival for a given geographic area for any user (e.g., step 158), the number of refreshes of the cache 170 may be reduced (e.g., refreshes with recalculated estimated arrival times). The location determination (e.g., step 154 and step 160) may be performed by a location service 180. The one or more devices 150 may query the location service 180, which may, in response to the user inputs (e.g., user consent) at step 152, use global positioning data of a user's device to identify the user's location and corresponding geographic area. For example, the vehicle 182 may include the user 182, whose device 184 may provide the input at step 152 and may be used to identify the location at step 154 and step 160. The vehicle 104 may include the user 186, whose device 188 may provide the input at step 152 and may be used to identify the location at step 154 and step 160.

In one or more embodiments, as long as the TTL for any estimated arrival time has not yet expired (e.g., while a person or vehicle is in transit to a location), any calls for a estimated arrival time may return the same value when the calls are made from within a same geo-fenced or chrono-fenced area (e.g., step 158). In this manner, calls made for the estimated arrival time of a same or multiple parties in transit in a same geo-fenced or chrono-fenced area may return the same estimated arrival time, whether the party in transit is at a location within the geo-fenced or chrono-fenced area that is further away from the destination location or is at a location within the geo-fenced or chrono-fenced area that is closer to the destination location (e.g., step 156). As a result, recalculations of the estimated arrival time may be reduced.

In one or more embodiments, because calls made for the estimated arrival time of a same or multiple parties in transit in a same geo-fenced or chrono-fenced area may return the same estimated arrival time (e.g., step 156), the estimated arrival time for different locations within the same geo-fenced or chrono-fenced area may be slightly inaccurate, an enhanced system may vary the size of a geo-fenced or chrono-fenced region and/or TTL for a geo-fenced or chrono-fenced region. For example, geo-fenced or chrono-fenced regions closer to a destination location may be smaller than geo-fenced or chrono-fenced regions further away from the destination location. Similarly, TTLs for geo-fenced or chrono-fenced regions closer to a destination location may be smaller than TTLs for geo-fenced or chrono-fenced regions further away from the destination location. In particular, accurate estimated arrival times may be more critical when the party in transit is closest to the destination location because someone at the destination location may need to take actions (e.g., gather purchased items, be at the destination location, etc.) as the estimated arrival time approaches, whereas the person at the destination location has more time when the party in transit is further away (e.g., knowing when the arrival is within five minutes is more important than knowing that the arrival is thirty minutes away). By varying geo-fence or chrono-fenced sizes and TTLs based on accuracy requirements, some inaccuracies may be tolerated (e.g., for regions further away from the destination location), allowing for fewer required cache refreshes, and triggering fewer actions (e.g., notifications to bag groceries) than are needed given the estimated arrival time.

In one or more embodiments, TTLs may correspond to respective geo-fenced or chrono-fenced regions. As a party begins transit to a destination location, the party may indicate (e.g., via a device input at step 152) that they are in transit to the destination location, triggering (and consenting to) the tracking of the party's location (e.g., using global navigation satellite system data of a device) while the party is in transit to the destination location. As the party's location is identified as within a geo-fenced or chrono-fenced area, the one or more devices 150 may wait until the TTL for the geo-fenced or chrono-fenced area expires before recalculating the estimated arrival time value for a geo-fenced or chrono-fenced area. A location service 180 may use the global navigation satellite system data to determine the updated location of the party's device, in which geo-fenced or chrono-fenced area the party's device is (e.g., the party's location), and the corresponding TTL for the geo-fenced area (or the one or more devices 150 may determine the corresponding TTL for the geo-fenced area). In this manner, the active TTL for the geo-fenced or chrono-fenced area (e.g., before TTL expiration) may prevent recalculations of estimated arrival times until the TTL expires for the geo-fenced or chrono-fenced area, reducing the need to update the estimated arrival time value for any geo-fenced or chrono-fenced area.

In one or more embodiments, the system 100 may force a refresh of the estimated arrival time value if an adjacent value varies beyond a threshold amount. For example, when a change in traffic may impact the estimated arrival time. When a person is within a region with a TTL (e.g., corresponding to an expected time needed to travel to an adjacent region with another TTL), the TTL expires, and the updated location determination by the location service indicates that the person is still in the same region (e.g., due to traffic), the estimated arrival time for the person may be the same as it was prior to the TTL expiration (e.g., the person's estimated arrival time may be thirty minutes, and after TTL expiration ten minutes later, the person may be in the same region with the same estimated thirty minute arrival time despite being ten minutes later). When traffic or inclement weather, for example, are detected, the cached value may be refreshed even prior to TTL expiration. Alternatively or in addition, the TTL for a region, or the region itself, may be adjusted (e.g., increased when traffic or inclement weather are detected in the region).

In one or more embodiments, when a party in transit to a destination location/location of interest is within a threshold amount of time from the destination location/location of interest, the system 100 may generate and present notifications. For example, the notifications may indicate the estimated arrival time from the cache 170. When the destination location/location of interest is a pick-up location, the notifications may indicate that pre-purchased items of the party in transit need to be gathered and/or otherwise prepared for pick-up. When an order has a threshold number of items, the threshold amount of time may be longer (e.g., to allow for more time to prepare the larger number of items for pick-up).

In one or more embodiments, when a TTL for an estimated time of arrival of a geographic area expires, the estimated time of arrival for the geographic area may be refreshed to reflect updated conditions. For example, traffic, weather, and other conditions may change over time, so the estimated times of arrival of multiple geographic areas may be updated to reflect the changing conditions, allowing for an accurate estimated time of arrival for any person in transit. The TTLs and/or geographic areas also may be updated. For example, smaller geographic areas and TTLs may be implemented to provide additional accuracy.

In one or more embodiments, while the vehicles (e.g., the vehicle 102 and the vehicle 104) are shown as automobiles, because a person's location may be determined based on their device, other modes of transportation may be used (e.g., trains, buses, bicycles, scooters, etc.). The user inputs at step 152 may indicate the mode of transportation, and the estimated time of arrival for a geographic region may be based on the mode of transportation. For example, transit to a destination location via train may use a different estimated time of arrival in the cache 170 than the estimated time of arrival using transit via automobile. The location of a user may be based on a user's personal device (e.g., the device 184 and the device 188), or may be based on vehicle devices, such as devices in the vehicle 102 and the vehicle 104, and devices in other modes of transportation (e.g., to track the transit progress of any mode of transportation). In addition, while the geographic areas are shown as rectangles for illustrative purposes, the present disclosure does not limit the boundaries of geographic areas to predefined shapes.

In one or more embodiments, the one or more devices 150 may include the device 184 and/or the device 188, or may be separate devices. For example, the one or more devices 150 may be associated with users at the destination location, allowing people at the destination location to determine when a user is arriving.

In one or more embodiments, the one or more devices 150, the device 184, and/or the device 188 may include a personal computer (PC), a smart home device, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2:
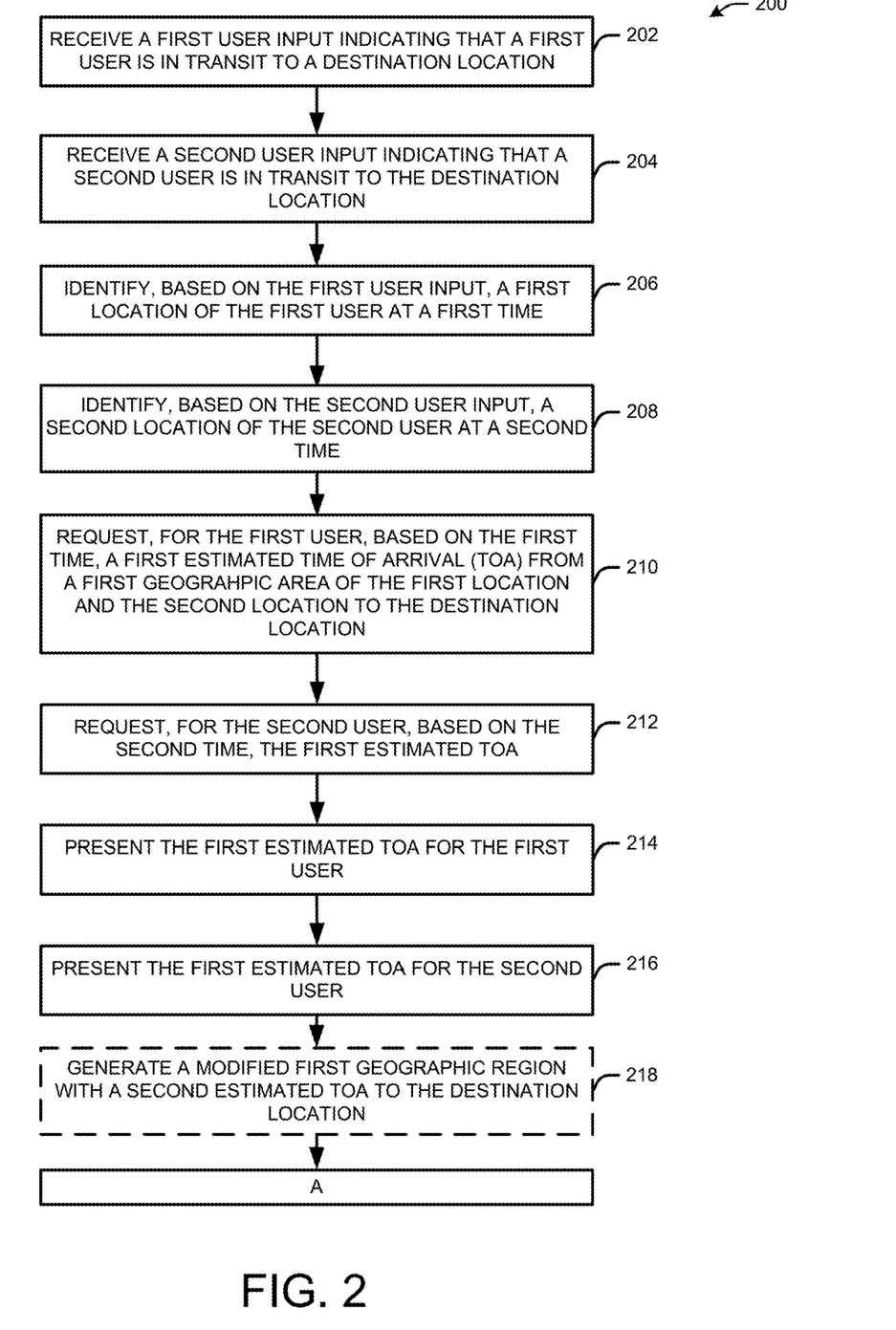
FIG. 2 illustrates a flow diagram for a process for enhanced geographical caching, in accordance with one or more example embodiments of the present disclosure.

FIG. 2 illustrates a flow diagram for a process 200 for enhanced geographical caching, in accordance with one or more example embodiments of the present disclosure.

At block 202, a device (or system, e.g., the one or more devices 150 of FIG. 1 or the system 100 of FIG. 1) may receive a first user input indicating that a first user (e.g., the user 182 of FIG. 1) is in transit to a destination location (e.g., the destination location 106 of FIG. 1). The first user input may be provided via a device (e.g., the device 184, the one or more devices 150 of FIG. 1), and may represent user consent for a location service (e.g., the location service 180 of FIG. 1) to track the location of the first user's device or a mode of transportation used by the first user (e.g., as provided by the input) to commute to the destination location.

At block 204, the device may receive a second user input indicating that a first user (e.g., the user 186 of FIG. 1) is in transit to a destination location (e.g., the destination location 106 of FIG. 1 or another destination location). The second user input may be provided via a device (e.g., the device 188, the one or more devices 150 of FIG. 1), and may represent user consent for a location service (e.g., the location service 180 of FIG. 1) to track the location of the second user's device or a mode of transportation used by the user (e.g., as provided by the input) to commute to the destination location.

At block 206, the device may identify, based on the first user input, a first location of the first user at a first time. Because of the first user input, the location service 180 of FIG. 1 may track the location of the first user's device or a mode of transportation used by the first user to commute to the destination location. The first location may be tracked continuously or periodically.

At block 208, the device may identify, based on the second user input, a second location of the second user at a second time (e.g., a same time as the first time or a different time). Because of the second user input, the location service 180 of FIG. 1 may track the location of the second user's device or a mode of transportation used by the second user to commute to the destination location. The second location may be tracked continuously or periodically.

At block 210, the device may request, for the first user, based on the first time and a first geographic location in which the first location is, an estimated time of arrival from the first geographic region to the destination location. At block 212, the device may request, for the second user, based on the second time and the second location, an estimated time of arrival for the geographic region in which the second location is located. When the first and second locations are within the same geographic region, the estimated time of arrival provided in response to the requests at block 210 and block 212 may be the same estimated time of arrival (e.g., a first estimated time of arrival), even when the first and second locations may be different locations within the same geographic region. The estimated time of arrival provided to the device in response to the requests at blocks 210 and 212 may be provided with a TTL value for the estimated time of arrival. The TTL value may indicate a time at which the estimated time of arrival for the geographic area will expire, and the TTL value may be indicated by a header in the packet in which the estimated time of arrival is sent to the device. In this manner, the device may rely on the estimated time of arrival for a geographic region until the TTL expires, and therefore would not need to generate an updated estimated arrival time of arrival for a geographic region prior to TTL expiration, even in response to multiple requests for an updated estimated arrival time for one or more users in transit. The requests at blocks 210 and 212 may indicate the geographic region in which a user's location is so that the estimated time of arrival provided to the device in return is the estimated time of arrival for the identified geographic region.

At block 214, the device may present (or facilitate presentation of, using another device) the first estimated time of arrival for the first user. At block 216, the device may present (or facilitate presentation of, using another device) the first estimated time of arrival for the second user. Optionally, at block 218, the device may generate a modified geographic region that may include at least a portion of the first geographic region. For example, a geographic region may be modified to accommodate accuracy requirements (e.g., a smaller geographic region for more accuracy regarding estimated time of arrival). The process 200 may continue to block A.

Figure 3:
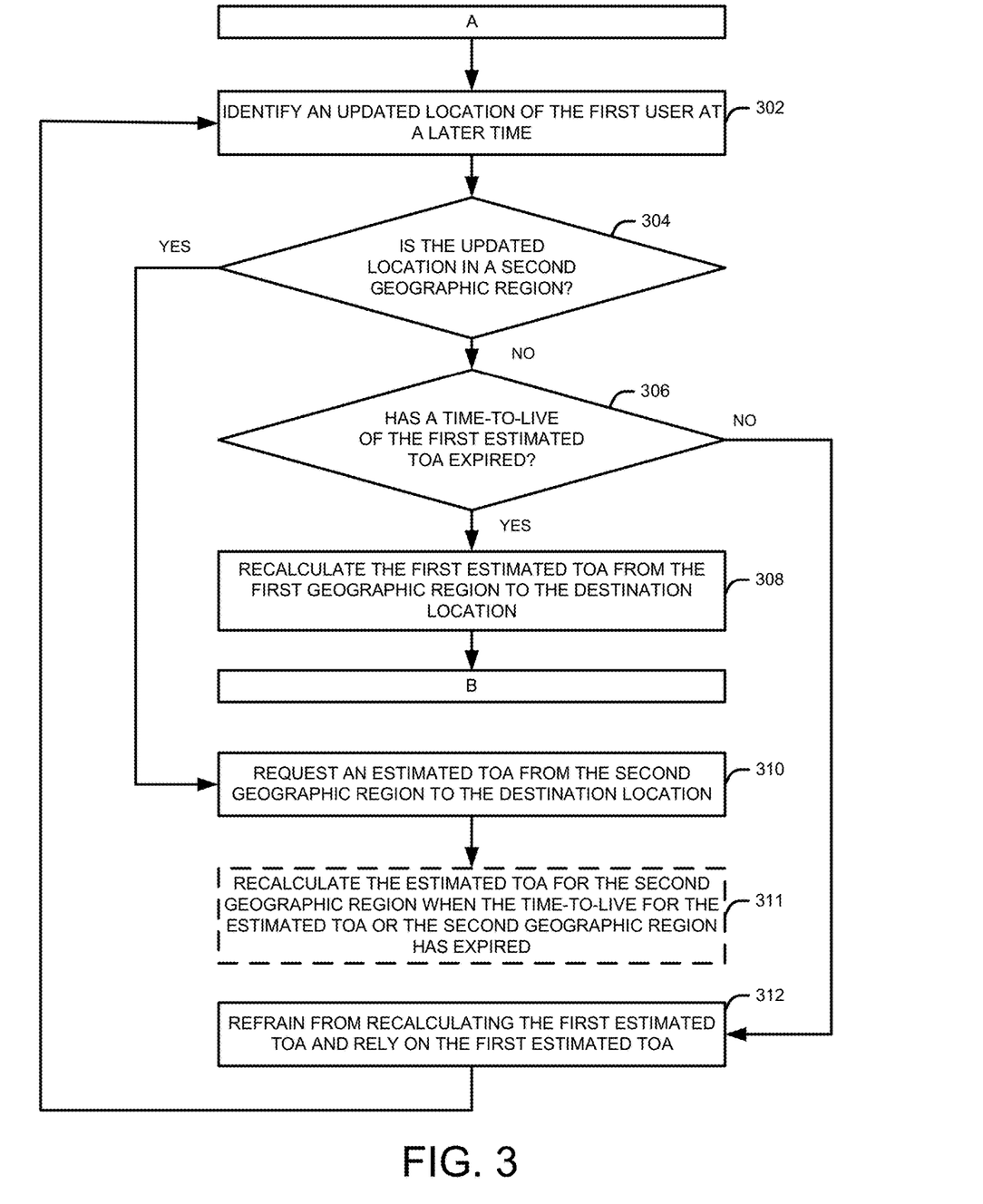
FIG. 3 illustrates a flow diagram for a process for enhanced geographical caching, in accordance with one or more example embodiments of the present disclosure.

FIG. 3 illustrates a flow diagram for a process 300 for enhanced geographical caching, in accordance with one or more example embodiments of the present disclosure. The process 300 may begin at block A, and therefore may include blocks used on combination with the blocks of the process 200 of FIG. 2.

At block 302, a device (or system, e.g., the one or more devices 150 of FIG. 1 or the system 100 of FIG. 1) may identify an updated location of the first user (e.g., the user 182 of FIG. 1) at a time later than the first time, for example, using the location service 180 of FIG. 1. At block 304, the device may determine whether the updated location of the first user is in a second geographic location different than the first geographic location. When the first user's updated location indicates that the first user is still in the first geographic region, the process 300 may continue to block 306.

At block 306, the device may determine whether the TTL for the estimated time of arrival from the first geographic region to the destination location has expired. The device may have access to the TTLs for any geographic region's estimated time of arrival, and may submit requests for the estimated time of arrival while the user is within the geographic area. Until the TTL expires, the device may refrain from recalculating the estimated time or arrival for that geographic region. For example, the TTL for an estimated time of arrival may be provided in a header of a packet in which the estimated time of arrival is provided to the device. When the TTL has expired, and the first user is still within the first geographic region, the device may, at block 308, request an estimated time of arrival from the first geographic region to the destination location. When the TTL has expired, the device may determine a recalculation of the estimated time of arrival for the first geographic region to the destination location. The recalculated estimated time of arrival may represent a refreshed time of arrival value for the geographic region, as detailed further below with respect to FIG. 4. From block 308, the process 300 may continue at block B.

When the updated geographic location of the first user at block 304 is in a second geographic region different than the first geographic region, the process 300 may continue at block 310. At block 310, the device may request an estimated time of arrival from the second geographic region, in which the first user may be located, to the destination location. The second geographic region may be closer to the destination location than the first geographic region is, so its estimated time of arrival may be sooner than the first estimated time of arrival from the first geographic area.

At block 311, optionally, when the TTL for the estimated time of arrival for the second geographic region has expired, the device may recalculate the estimated time of arrival for the second geographic region and rely on that estimate.

When the first user is still in the first geographic region at block 304, and the TTL for the first geographic region has not yet expired at block 306, the process 300 may continue at block 312. At block 312, the device may refrain from recalculating the first estimated time of arrival, and may continue to rely on the first estimated time of arrival for the first user while the first user is within the first geographic area and until the TTL for the first geographic area has expired (e.g., even as the first user moves locations within the first geographic area, the first estimated time of arrival may be used as the estimate for any such location within the first geographic region). As a result, recalculations to generate updated estimated times of arrival may be reduced, along with corresponding refreshes to cache the updated estimates.

Figure 4:
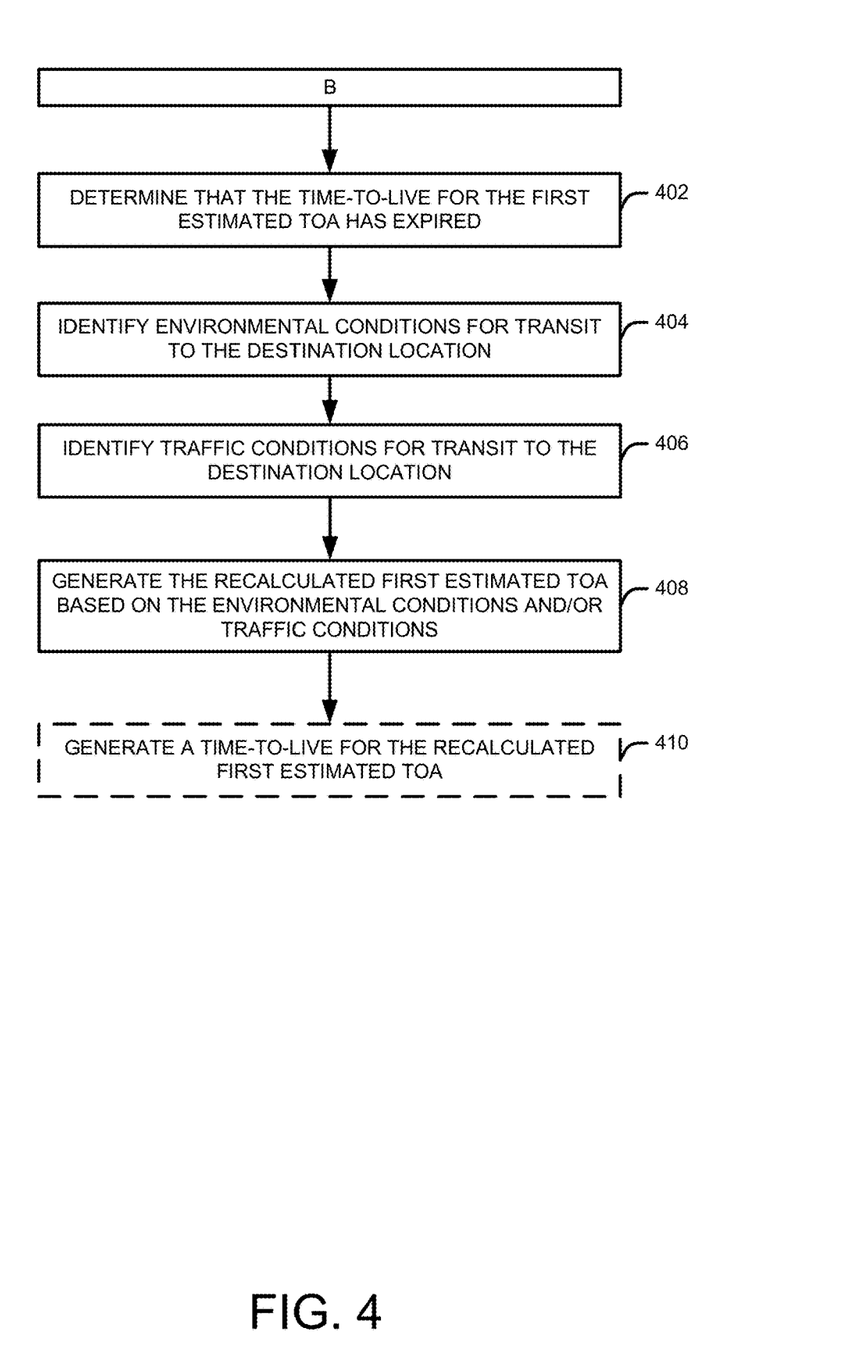
FIG. 4 illustrates a flow diagram for a process for enhanced geographical caching, in accordance with one or more example embodiments of the present disclosure.

FIG. 4 illustrates a flow diagram for a process 400 for enhanced geographical caching, in accordance with one or more example embodiments of the present disclosure. The process 400 may begin at block B, and therefore may include blocks used on combination with the blocks of the process 300 of FIG. 3.

At block 402, a device (or system, e.g., the one or more devices 150 of FIG. 1 or the system 100 of FIG. 1) may determine that the estimated TTL for the first geographic region (e.g., for the first estimated time of arrival) has expired. Upon the TTL expiration, the first estimated time of arrival may be considered outdated, and may be refreshed (e.g., at the cache 170 of FIG. 1).

At block 404, the device may identify environmental conditions for transit to the destination location. Environmental conditions may include weather, time of day, day of the week, and the like. At block 406, the device may identify traffic conditions for transit to the destination location. Traffic conditions may include amounts of traffic, accidents, stoplight functionality, and the like. The environmental conditions (e.g., data) and the traffic conditions (e.g., data) may be provided to the device via one or more services/applications.

At block 408, the device may generate the recalculated first estimated time of arrival for the first geographic area. The first geographic area may be the same as prior to the TTL expiration, or the first geographic area may be modified (e.g., block 218 of FIG. 2). For example, when there is heavier traffic or inclement weather, the estimated time of arrival may be later than the previous estimated time of arrival. In this manner, when the first user is still within the first geographic area after TTL expiration, the recalculated estimated time of arrival for the first user may not be the same as the first estimated time of arrival (e.g., when the first estimated time of arrival is in ten minutes, after five minutes, the recalculated estimated time of arrival may not still be ten minutes).

At block 410, optionally, the device may generate a TTL for the recalculated first estimated time of arrival. The TTL may be the same as the previous TTL, or may be different (e.g., based on the environmental and/or traffic conditions, accuracy requirements, and/or whether the first geographic region has been modified).

Figure 5:
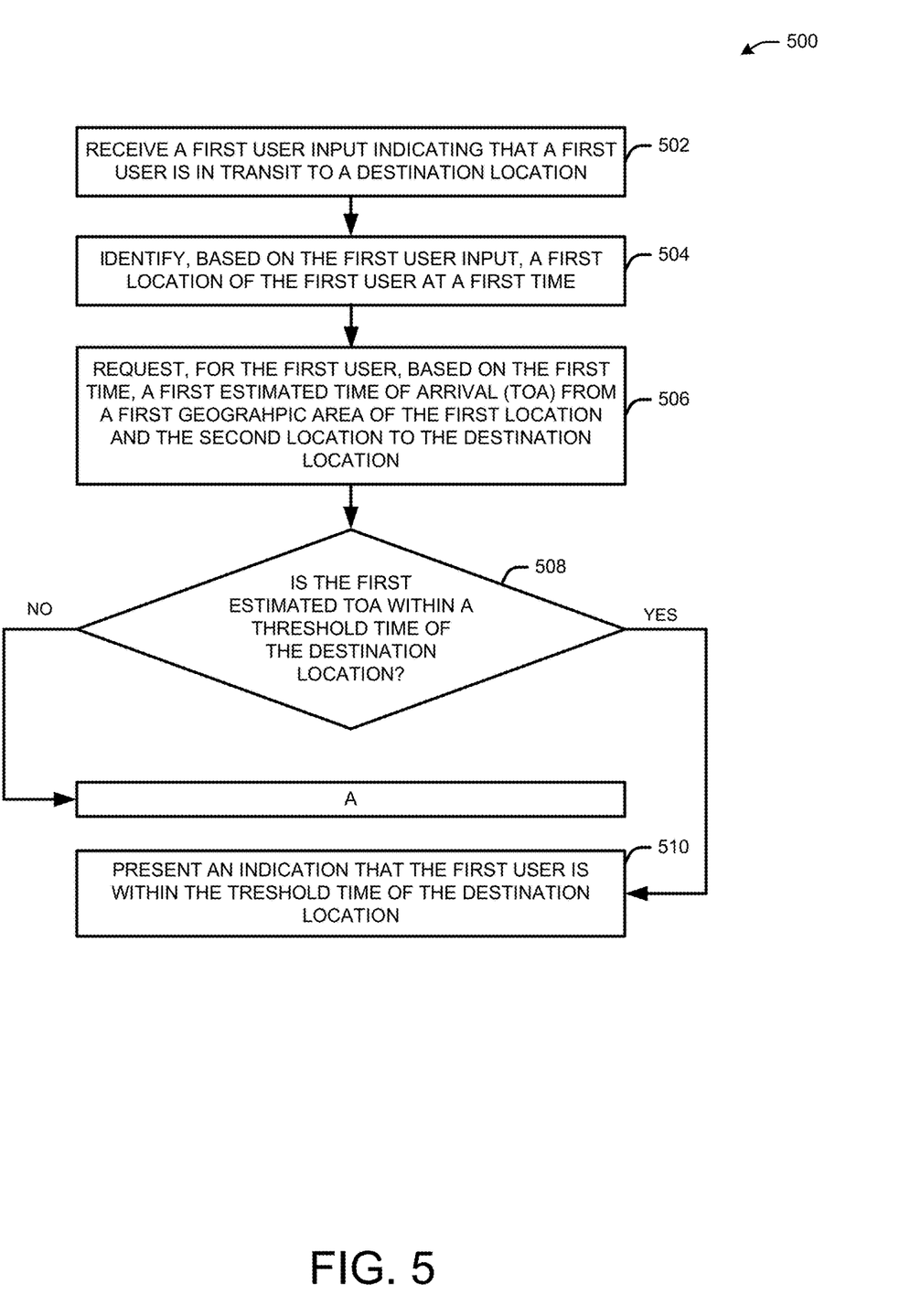
FIG. 5 illustrates a flow diagram for a process for enhanced geographical caching, in accordance with one or more example embodiments of the present disclosure.

FIG. 5 illustrates a flow diagram for a process 500 for enhanced geographical caching, in accordance with one or more example embodiments of the present disclosure.

At block 502, a device (or system, e.g., the one or more devices 150 of FIG. 1 or the system 100 of FIG. 1) may receive a first user input indicating that a first user (e.g., the user 182 of FIG. 1) is in transit to a destination location (e.g., the destination location 106 of FIG. 1). The first user input may be provided via a device (e.g., the device 184, the one or more devices 150 of FIG. 1), and may represent user consent for a location service (e.g., the location service 180 of FIG. 1) to track the location of the first user's device or a mode of transportation used by the first user (e.g., as provided by the input) to commute to the destination location.

At block 504, the device may identify, based on the first user input, a first location of the first user at a first time. Because of the first user input, the location service 180 of FIG. 1 may track the location of the first user's device or a mode of transportation used by the first user to commute to the destination location. The first location may be tracked continuously or periodically.

At block 506, the device may request, for the first user, based on the first time and a first geographic location in which the first location is, a first estimated time of arrival from the first geographic region to the destination location.

At block 508, the device may determine whether the first estimated time of arrival is within a threshold arrival time of the destination location. For example, when the threshold arrival time is seven minutes, and the first estimated time of arrival is within seven minutes, such may trigger an action to be taken (e.g., at the destination location) because the first user is arriving soon. When the first estimated time of arrival is not within the threshold arrival time of the destination location, the process 500 may continue to block A of FIG. 3, where the first user's location may continue to be monitored until the first user is within the threshold arrival time of the destination location (and monitored until arrival).

When the first estimated time of arrival is within the threshold arrival time of the destination location, the process 500 may continue to block 510, where the device may present (or facilitate presentation at another device) an indication that the first user is within the threshold arrival time of the destination location. The indication may communicate to person or device, for example, to prepare items being picked up by the first user upon arrival. The threshold arrival time of the destination location may be dynamic based on factors such as the type and/or amount of items being picked up (e.g., corresponding to an amount of time to prepare the items for pick up by the first user upon arrival).

The descriptions herein are not meant to be limiting.

Figure 6:
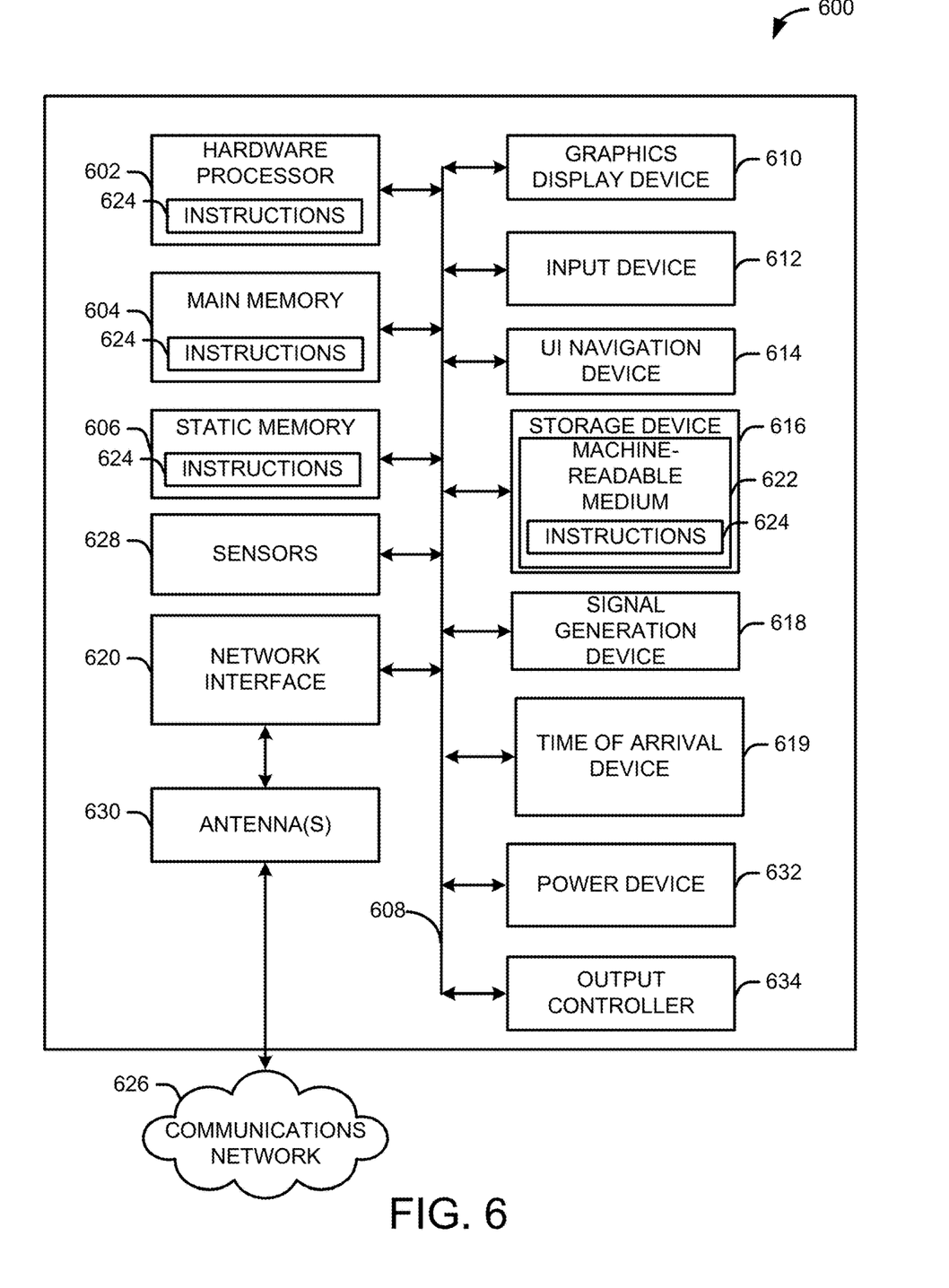
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the device 150 of FIG. 1, the location service 180 of FIG. 1, the device 184 of FIG. 1, and/or the device 188 of FIG. 1) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a time of arrival device 619 (e.g., capable of performing any of the functions described in FIGS. 1-5), a network interface device/transceiver 620 coupled to antenna(s) 630, and one or more sensors 628, such as a microphone, a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for reducing cache calls and refreshes, the method comprising:
    receiving, by at least one processor of a device, a first user input indicative of a first user being in transit to a destination location;
    identifying, by the at least one processor, based on the first user input, a first location of a first device of the first user at a first time;
    receiving, by the at least one processor, a second user input indicative of a second user being in transit to the destination location;
    identifying, by the at least one processor, based on the second user input, a second location of a second device of the second user at a second time;
    determining, by the at least one processor, for the first user, based on the first time, a first estimated time of arrival from a first geographical area to the destination location, the first geographical area comprising the first location and the second location;
    determining, by the at least one processor, for the second user, based on the second time, the first estimated time of arrival;
    presenting, by the at least one processor, for the first user, based on the first time, the first estimated time of arrival;
    presenting, by the at least one processor, for the second user, based on the second time, the first estimated time of arrival;
    identifying, by the at least one processor, a third location of the first device at a third time, wherein the third location is within the first geographical area;
    determining, by the at least one processor, that a time-to-live (TTL) of the first estimated time of arrival has not expired at the third time;
    refraining, by the at least one processor, from recalculating the first estimated time of arrival based on the determination that the TTL has not expired at the third time; and
    presenting, by the at least one processor, for the first user, based on the third time, the first estimated time of arrival.

2. The method of claim 1, further comprising:
    identifying a fourth location of the second device at a fourth time, wherein the fourth location is within the first geographical area;

determining that the TTL has expired at the fourth time;
recalculating, based on the TTL expiration at the fourth time, the first estimated time of arrival from the first geographical area to the destination location; and
presenting, for the second user, based on the fourth time, the recalculated first estimated time of arrival,
wherein the recalculated first estimated time of arrival is different than the first estimated time of arrival.

3. The method of claim 2, further comprising:
identifying traffic data associated with transit from the first geographical area to the destination location; and
generating, based on the traffic data, the recalculated first estimated time of arrival.

4. The method of claim 1, further comprising:
identifying a fourth location of the first device at a fourth time, wherein the fourth location is within a second geographical area different than the first geographical area;
determining, for the first user, based on the fourth time, a second estimated time of arrival from the second geographical area to the destination location; and
presenting, for the first user, based on the fourth time, the second estimated time of arrival,
wherein the second estimated time of arrival is different than the first estimated time of arrival.

5. A method for reducing cache refreshes, the method comprising:
receiving, by at least one processor of a device, a first user input indicative of a first user being in transit to a destination location;
identifying, by the at least one processor, based on the first user input, a first location of a first device of the first user at a first time;
receiving, by the at least one processor, a second user input indicative of a second user being in transit to the destination location;
identifying, by the at least one processor, based on the second user input, a second location of a second device of the second user at a second time;
determining, by the at least one processor, for the first user, based on the first time, a first estimated time of arrival from a first geographical area to the destination location, the first geographical area comprising the first location and the second location;
determining, by the at least one processor, for the second user, based on the second time, the first estimated time of arrival;
identifying, by the at least one processor, a third location of the first device at a third time, wherein the third location is within the first geographical area;
determining, by the at least one processor, that a time-to-live (TTL) of the first estimated time of arrival has not expired at the third time;
refraining, by the at least one processor, from recalculating the first estimated time of arrival based on the determination that the TTL has not expired at the third time; and
presenting, by the at least one processor, for the first user, based on the third time, the first estimated time of arrival.

6. The method of claim 5, further comprising:
identifying a fourth location of a third device of a third user at a fourth time, wherein the first geographical area comprises the fourth location, and wherein the TTL has not expired at the first time, the second time, and the third time;
presenting, for the first user, based on the first time, the first estimated time of arrival;
presenting, for the second user, based on the second time, the first estimated time of arrival; and
presenting, for the third user, based on the third time, the first estimated time of arrival.

7. The method of claim 5, further comprising:
identifying a fourth location of the second device at a fourth time, wherein the fourth location is within the first geographical area;
determining that the TTL has expired at the fourth time;
recalculating the first estimated time of arrival from the first geographical area to the destination location; and
presenting, for the second user, based on the fourth time, the recalculated first estimated time of arrival.

8. The method of claim 7, further comprising:
identifying traffic data associated with transit from the first geographical area to the destination location; and
generating, based on the traffic data, the recalculated first estimated time of arrival.

9. The method of claim 7, further comprising:
identifying weather data associated with transit from the first geographical area to the destination location; and
generating, based on the weather data, the recalculated first estimated time of arrival.

10. The method of claim 5, further comprising:
identifying a fourth location of the first device at a fourth time, wherein the fourth location is within a second geographical area different than the first geographical area;
determining, for the first user, based on the fourth time, a second estimated time of arrival from the second geographical area to the destination location; and
presenting, for the first user, based on the fourth time, the second estimated time of arrival,
wherein the second estimated time of arrival is different than the first estimated time of arrival.

11. The method of claim 10, wherein the second geographical area is geographically closer to the destination location than the first geographical area, and wherein the second estimated time of arrival is earlier than the first estimated time of arrival.

12. The method of claim 10, wherein the second geographical area is geographically closer to the destination location than the first geographical area, and wherein the second geographical area is geographically smaller than the first geographical area.

13. The method of claim 5, further comprising:
generating a second geographical area comprising at least a portion of the first geographical area; and
generating a second estimated time of arrival from the second geographical area,
wherein the second estimated time of arrival is different than the first estimated time of arrival.

14. The method of claim 5, further comprising:
determining that the first estimated time of arrival is within a threshold time to arrive at the destination location; and
presenting, to a third device at the destination location, based on the first estimated time of arrival being within a threshold time to arrive at the destination location, an indication that the first user will arrive at the destination at the first estimated time of arrival.

15. The method of claim 5, further comprising:
generating a second TTL for the first estimated time of arrival, the second TTL different than the TTL.

16. The method of claim 5, further comprising:
identifying a fourth location of the first device at a fourth time, wherein the fourth location is within a second geographical area different than the first geographical area;
determining, for the first user, based on the fourth time, a second estimated time of arrival from the second geographical area to the destination location;
determining that a travel time for the first device to the first geographical area to the second geographical area is greater than a difference between the first estimated time of arrival and the second estimated time of arrival; and
recalculating, based on the travel time being greater than the difference, the first estimated time of arrival.

17. A system comprising memory and at least one processor, the at least one processor configured to:
receive a first user input indicative of a first user being in transit to a destination location;
identify, based on the first user input, a first location of a first device of the first user at a first time;
receive a second user input indicative of a second user being in transit to the destination location;
identify, based on the second user input, a second location of a second device of the second user at a second time;
determine, for the first user, based on the first time, a first estimated time of arrival from a first geographical area to the destination location, the first geographical area comprising the first location and the second location;
determine, for the second user, based on the second time, the first estimated time of arrival;
identify a third location of the first device at a third time, wherein the third location is within the first geographical area;
determine that a time-to-live (TTL) of the first estimated time of arrival has not expired at the third time;
refrain from recalculating the first estimated time of arrival based on the determination that the TTL has not expired at the third time; and
present, for the first user, based on the third time, the first estimated time of arrival.

18. The system of claim 17, wherein the at least one processor is further configured to:
identify a fourth location of a third device of a third user at a fourth time, wherein the first geographical area comprises the fourth location, and wherein the TTL has not expired at the first time, the second time, and the third time;
present, for the first user, based on the first time, the first estimated time of arrival;
present, for the second user, based on the second time, the first estimated time of arrival; and
present, for the third user, based on the third time, the first estimated time of arrival.

19. The system of claim 17, wherein the at least one processor is further configured to:
identify a fourth location of the second device at a fourth time, wherein the fourth location is within the first geographical area;
determine that the TTL has expired at the fourth time;
recalculating the first estimated time of arrival from the first geographical area to the destination location; and
present, for the second user, based on the fourth time, the recalculated first estimated time of arrival.

20. The system of claim 17, wherein the at least one processor is further configured to:
identify a fourth location of the first device at a fourth time, wherein the fourth location is within a second geographical area different than the first geographical area;
determine, for the first user, based on the fourth time, a second estimated time of arrival from the second geographical area to the destination location; and
present, for the first user, based on the fourth time, the second estimated time of arrival,
wherein the second estimated time of arrival is different than the first estimated time of arrival.

* * * * *